United States Patent Office
3,630,948
Patented Dec. 28, 1971

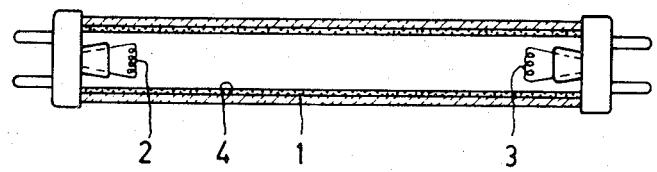
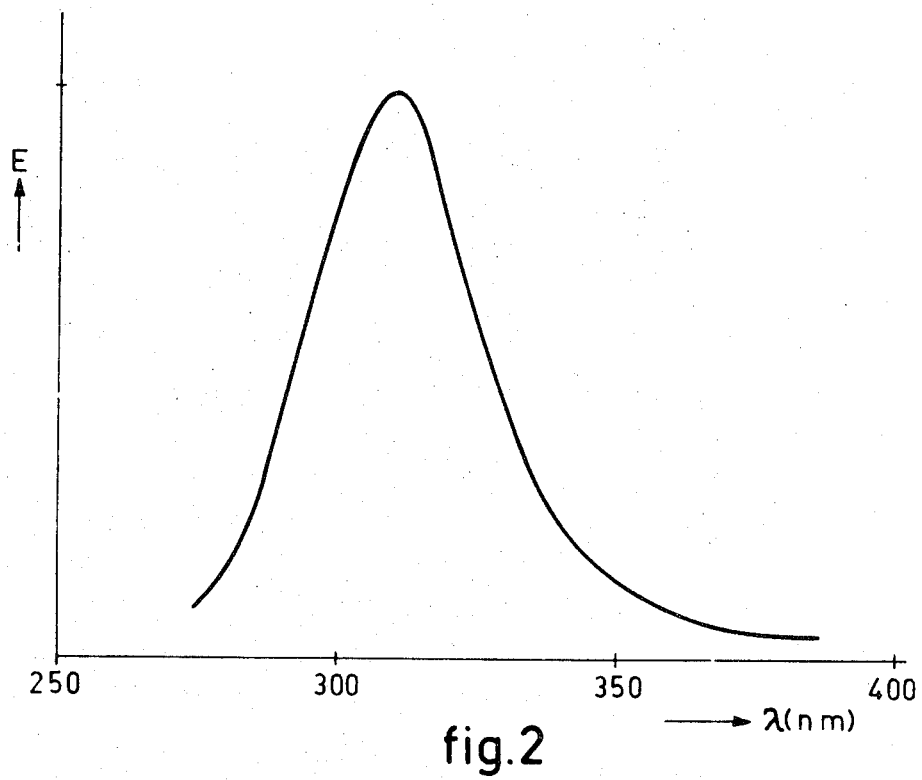

3,630,948
BISMUTH ACTIVATED YTTRIUM OXYSULPHATE
George Blasse and Jaap de Vries, Emmasingel, Eindhoven, Netherlands, assignors to U.S. Philips Corporation, New York, N.Y.
Filed Feb. 26, 1970, Ser. No. 14,397
Claims priority, application Netherlands, Feb. 28, 1969, 6903112
Int. Cl. C09k 1/22
U.S. Cl. 252—301.4 S
2 Claims

ABSTRACT OF THE DISCLOSURE

A luminescent material which exhibits radiation in the ultraviolet region and which is a bismuth activated yttrium oxysulfate.

The invention relates to a luminescent screen provided with a luminescent yttrium oxysulphate. Furthermore the invention relates to a low-pressure mercury vapour discharge lamp which includes such a screen and to such a luminescent yttrium oxysulphate.

The unactivated yttrium oxysulphate ($Y_2SO_6$) is known from a publication by Pitha, Smith and Ward in J. Amer. Chem. Soc., 69, 1870 (1947). Haynes and Brown describe in an article in J. Electrochem. Soc., 115, 1060 (1968) the luminescent properties of trivalent europium-activated sulphates, oxysulphates and oxysulphides of rare earths. The oxysulphates of lanthanum and gadolinium activated by $Eu^{3+}$ are then found to give a red emission upon excitation by ultraviolet radiation. The article states with reference to the yttrium oxysulphate that this compound is not stable so that it could not be manufactured. Lecoq de Boisbaudran states in Comptes Rendus (Paris), 103, 1064 (1886) the luminescent properties of yttrium sulphate activated by trivalent bismuth ($Y_2(SO_4)_3$). Also this substance has an emission in the red part of the spectrum.

In many photochemical processes it is desirable or even necessary to have a radiation source available which emits radiation in the ultraviolet part of the spectrum. Dependent on the nature of the photochemical process, radiation must be used at wavelengths within a very defined wavelength range in order to cause the process to proceed optimally. To this end it is known to use a gas discharge lamp in combination with a suitable luminescent substance. The number of luminescent substances suitable for such purposes is limited.

A luminescent screen according to the invention is provided with a luminescent yttrium oxysulphate and is characterized in that the yttrium oxysulphate comprises trivalent bismuth as an activator and satisfies the formula $Y_{2-x}Bi_xSO_6$, wherein $0.002 \leq x \leq 0.20$.

The bismuth-activated yttrium oxysulphate may be excited satisfactorily by short-wave ultraviolet radiation, for example, by the radiation emitted by a low-pressure mercury vapor discharge and then has an emission in the ultraviolet part of the spectrum. The radiation conversion efficiency is high and the greatest part of the emitted energy comprises radiation at wavelengths between 290 and 330 nm. at a maximum of approximately 310 nm.

As a result of the high efficiency and the favourable spectral distribution of the emitted radiation a luminescent screen according to the invention may advantageously be used in so-called sun lamps or erythema lamps. As is known the erythema sensitivity is greatest for radiation at wavelengths between approximately 280 and 320 nm. Furthermore, a luminescent screen according to the invention is very suitable for photochemical hardening of lacquers and binders, since for this use radiation at wavelengths between approximately 290 and 350 nm. is most suitable.

The quantity of trivalent bismuth may be varied within the above given limits, but is preferably chosen to be between 0.006 and 0.04 because then the highest radiation outputs are obtained as will be shown hereinafter.

A particular advantage of the luminescent yttrium oxysulphate according to the invention is that they can be provided satisfactorily on the support of a luminescent screen for low-pressure mercury vapor discharge lamps. They are insensitive to oxidation which is important because they are brought to an increased temperature for some time in air when they are provided on the screen. Furthermore, it is an advantage that the yttrium oxysulphate does not dissolve in water. It has been found that after a treatment during which it is added to water and is dried after approximately 20 hours again the yttrium oxysulphate according to the invention shows the same radiation output as that prior to the treatment.

When excited by electrons, the bismuth-activated yttrium oxysulphate according to the invention produces the same emission as when excited by ultraviolet radiation.

The invention will now be described with reference to two examples, a table and a drawing.

EXAMPLE 1

For preparing the luminescent substance defined by the formula $Y_{1.98}Bi_{0.02}SO_6$, 22.80 gms. of $Y_2O_3$ and 0.464 gms. of $Bi_2O_3$ were carefully mixed. This mixture was dissolved in sulphuric acid, whereafter the solution was evaporated to dryness. The residue thus obtained was fired in air for approximately 2 hours at a temperature of approximately 1000° C. After cooling the firing product obtained was ground and sieved. X-ray diffraction analyses on the powder have shown that the powder has the structure of yttrium oxysulphate. The powder diagram of $Y_2SO_6$ is known from the article by Ballestracci and Mereschal in Mat. Res. Bull., 2 993 (1967).

EXAMPLE 2

A mixture was made of 22.80 gms. of $Y_2O_3$, 0.464 gms. of $Bi_2O_3$ and 46.20 gms. of $(NH_4)_2SO_4$. This mixture was slowly heated to 1000° C. whereafter it was fired in air at that temperature for approximately 2 hours. The cooled firing product has the structure of yttrium oxysulphate and satisfies the formula $Y_{1.98}Bi_{0.02}SO_6$. The luminescent substance prepared in this manner has the same radiation output on excitation by ultraviolet radiation as the substance of Example 1.

TABLE

| Formula | r, in percent | q, in percent | r.s.o. |
|---|---|---|---|
| $Y_{1.994}Bi_{0.006}SO_6$ | 40.5 | 60 | 36 |
| $Y_{1.98}Bi_{0.02}SO_6$ | 19 | 50 | 40.5 |
| $Y_{1.96}Bi_{0.04}SO_6$ | 14 | 45 | 39 |
| $Y_{1.94}Bi_{0.06}SO_6$ | 11 | 30 | 27 |
| $Y_{1.9}Bi_{0.1}SO_6$ | 9 | 25 | 23 |
| $Y_{1.8}Bi_{0.2}SO_6$ | 6 | 20 | 19 |

The table summarises the results of measurements on luminescent substances according to the invention which are prepared in a manner analogous to that of Example 2. The first column of the table states the formula of the luminescent substance. All measurements were performed upon excitation by radiation at a wavelength of 254 nm. The second column shows the reflection r of the exciting radiation in percents.

The third column of the table states the quantum efficiency q in percents. The percentages stated for q indicate the conversion efficiency of the absorbed exciting quantums. To obtain a measure of the radiation output of the luminescent substances, the quantum efficiency is to be multiplied by the absorption factor which is fixed at 100 −r. The relative radiation output (r.s.o.) is then found from the equation $$r.s.o. = \frac{100-r}{100}$$

The values for the relative radiation output are stated in the fourth column of the table. It is clearly evident that the highest outputs are obtained at bismuth contents of between 0.006 and 0.04.

For all substances mentioned in the table the maximum of the emission spectrum is found to be at 310 nm.

In the drawing:

FIG. 1 diagrammatically shows a low-pressure mercury vapour discharge lamp provided with a luminescent screen according to the invention, and FIG. 2 is a graphic representation of the radiation intensity of the luminescent substances according to the invention as a function of the wavelength.

In FIG. 1 the reference numeral 1 denotes the envelope of a low-pressure mercury vapour discharge lamp. Electrodes 2 and 3 are provided at the ends of the lamp. The inner side of the envelope 1 which comprises, for example, quartz glass is coated with a luminescent layer 4 which comprises a luminescent yttrium oxysulphate according to the invention. The yttrium oxysulphate is provided on the envelope 1 in one of the many conventional manners.

The graph of FIG. 2 shows the wavelength λ plotted in nm. on the abscissa. The radiation intensity E of the luminescent yttrium oxysulphates according to the invention is plotted in arbitrary units on the ordinate. The emission spectrum has a maximum at 310 nm. and the emission is largely effected at wavelengths between 290 and 330 nm.

Finally it is to be noted that the yttrium may be partly replaced by lanthanum. The structure of the yttrium oxysulphate is maintained if not more than approximately 10% of the yttrium is replaced by lanthanum. In case of such a replacement the maximum of the emission spectrum is shifted to slightly longer wavelengths; however, the quantum efficiency decreases considerably. If the yttrium is replaced entirely by lanthanum, the bismuth-activated lanthanum oxysulphate according to the formula $La_{2-x}Bi_xSO_6$ is obtained which upon excitation by ultraviolet radiation has an emission in the long-wave ultraviolet part of the spectrum and a maximum of approximately 380 nm. When excited by electrons, this substance has the same emission as when excited by ultraviolet radiation.

What is claimed is:

1. A luminescent yttrium oxysulphate, characterized in that the yttrium oxysulphate comprises trivalent bismuth as an activator and satisfies the formula $$Y_{2-x}Bi_xSO_6$$

wherein $0.002 \leqslant x \leqslant 0.20$.

2. A luminescent yttrium oxysulphate as claimed in claim 1, characterized in that $0.006 \leqslant x \leqslant 0.04$.

References Cited

UNITED STATES PATENTS 3,475,342  10/1969  Datta _____ 252—301.4

ROBERT D. EDMONDS, Primary Examiner